3,664,850
PROCESS FOR PRESERVING MEATS
William E. Kentor, 228 Maple Ave.,
Highland Park, Ill. 60035
Filed Dec. 3, 1969, Ser. No. 881,694
Int. Cl. A23b 1/00, 1/02, 1/04
U.S. Cl. 99—157                                   1 Claim

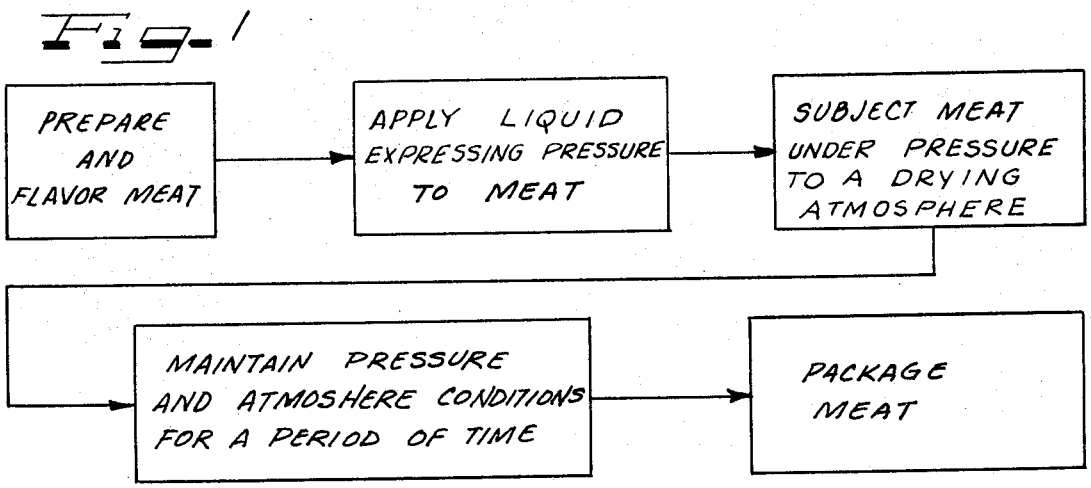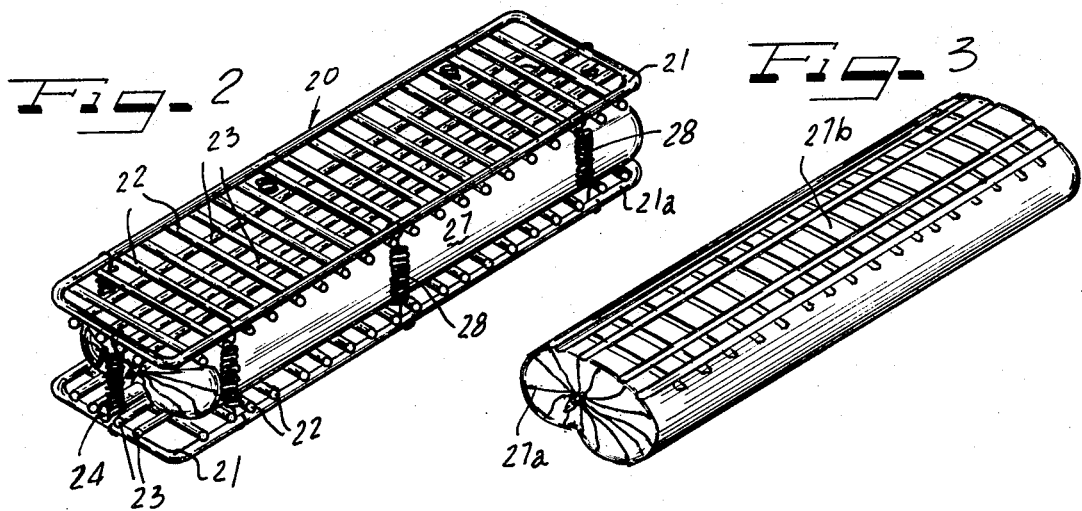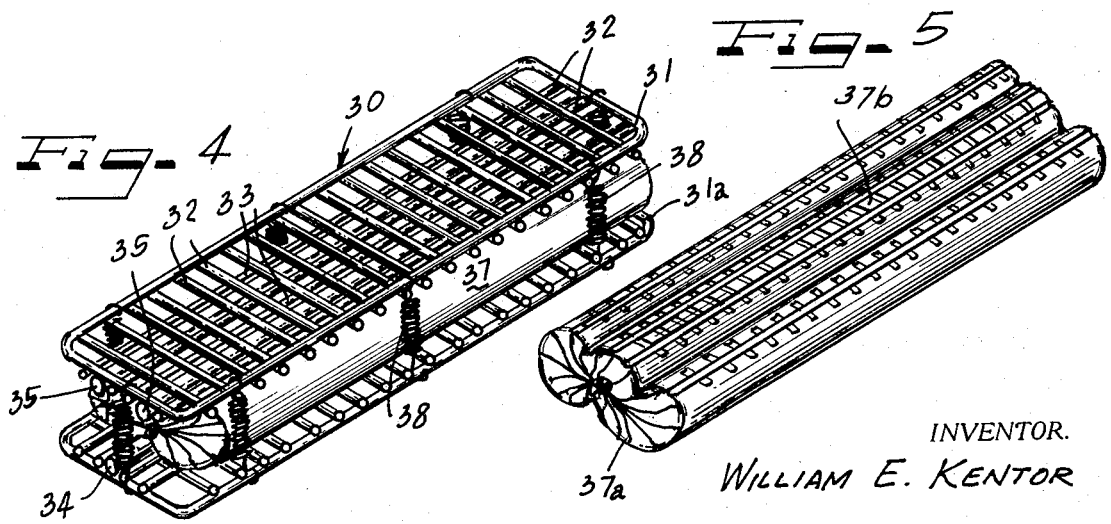

ABSTRACT OF THE DISCLOSURE

A process for preserving fresh comminuted and/or whole meats which comprises pre-treating the meats with an appropriate flavoring or condiment mixture, applying positive liquid-expressing pressure to the pre-treated meats to force moisture therefrom and subjecting the meats while under liquid-expressing pressure to a drying atmosphere in motion relative to said meat and under low humidity and high temperature conditions for a period of time sufficient (i.e. about 18 hours per pound of pre-treated meat, depending upon the exposed surface area thereof) to rapidly remove moisture to a maximum of about 50% by weight of the finished meats and thereby impart shelf stability to the meats under ambient air conditions without need of refrigeration. The dried meats are then sliced and packaged as desired.

---

This invention relates generally to the preservation of meats and more particularly to a process of preservation of meats rendering them stable to ambient storage.

Preservation of fresh meats is well known through a number of diverse processes including drying. Drying of meats primarily allows the production of a stable meat product which may be kept at ambient condition without spoilage. Traditional methods of drying meats generally comprise exposing the prepared meats or meat products to an atmosphere which is at a temperature of about 60° F. and is somewhat drier than the relative humidity of the meat being dried. In such traditional methods of drying meats, a slow transfer of moisture is obtained from the product to the gaseous environment in which it is placed.

In accordance with well established teachings of the art, it is considered necessary to conduct the drying at a very slow rate. These considerations are based on at least three somewhat related factors. First slow, drying is thought to prevent "case hardening." Case hardening is thought to be caused by the rapid removal of moisture from the product resulting in the phenomenon wherein meat solutes (i.e. soluble proteins, fats, etc.) become concentrated along the outer peripheral surfaces of the dried products. Such meat solubles apparently migrate along with the moisture toward the meat surfaces and form barriers thereat. These solute barriers tend to prevent further evaporation of moisture resulting in an insufficiently dried product that has a relatively hard peripheral surface and a somewhat softer interior yielding a non-uniform product which may spoil in the center when the product is subsequently stored at temperatures that encourage bacterial growth. A generally accepted theory is that the moisture should not evaporate from the surface of the meat at a rate which is more rapid than the rate of migration of moisture from the interior of the meat to the surface of the meat.

Secondly, slow drying is thought to maintain desirable aesthetic surface characteristics in the dried meats. Thus, it is generally desirable that the dried meat product have a smooth exterior surface and slow drying maintains this characteristic whereas rapid drying causes wrinkling and collapse or cave-in of the surface. Thirdly, slow drying is thought to aid in maintaining a fairly uniform density throughout the meat product during drying, especially when the product is of a comminuted nature. Rapid drying results in outward displacement of the center of comminuted meat products resulting in "hollow core" products. Of course, such hollow cores are undesirable for a number of reasons including aesthetic reasons as well as the fact that such hollow cores tend to support the growth of mold in the interior of such meat products.

For these and various additional reasons [see U.S. Dept. of Agriculture, I Food Dehydration, Principles, (1963) and II Food Dehydration, Products and Technology (1964)] slow drying of meat is considered necessary. However, such slow drying has obvious drawbacks including length of drying time, requirements for large facilities and inventories to maintain an adequate supply of dried meat products, excessive labor, etc. It is therefore desirable to achieve a drying process eliminating, at least in part, the drawbacks associated with traditional drying processes while providing an improved meat product.

Accordingly, it is an important object of the invention to provide an improved process of preserving meats by rapidly removing moisture therefrom in a relatively short period of time without imparting adverse effect on such meats.

It is another important objects of the instant invention to provide a method of drying meats wherein a desired shape may be irreversibly imparted to the meat.

It is yet another object of the instant invention to provide an improved process of preserving meats by the use of low humidity-high temperature conditions to achieve rapid drying of meat without encountering any of the aforesaid drawbacks.

Other features, objects and advantages of the invention will be readily apparent from the following description of certain preferred embodiments thereof, taken in conjunction with the accompanying drawings; although variations and modifications may be effected without departing from the spirit and scope of the novel concepts of the disclosure, and in which:

FIG. 1 is a flow diagram of a preferred process of the instant invention;

FIG. 2 is a somewhat isometric view of a device utilized in the practice of the invention;

FIG. 3 is a somewhat isometric view of a finished product produced in accordance with the principles of the invention with the device of FIG. 2;

FIG. 4 is a view somewhat similar to FIG. 2 illustrating another device utilized in the practice of the invention; and FIG. 5 is a view somewhat similar to FIG. 3 illustrating a finished product produced with the device of FIG. 4.

As shown on the drawings:

As shown in FIG. 1, the process of the invention generally comprises first suitably preparing and flavoring or pre-curing fresh meats. This generally involves taking selected portions of meats, cleansing them and removing undesirable portions of fat, gristle, etc., and then intermixing a flavoring or curing mixture with such meats and holding the mixture until the meats become sufficiently treated. A wide variety of curing or flavoring agents may be utilized as is well known in the art and include salt, sodium nitrate and sodium nitrite, various peppers, flavoring agents such as liquid smoke, various antioxidants such as sodium ascorbate, etc. Such curing mixtures are generally well known in the art and may be utilized in varying proportions. This mixture of meat and curing agents is held at low temperatures for a period of time until the treatment has been effected. This process is generally referred to in the art as a dry curing process.

The next step in the process, as will be noted from FIG. 1, is to apply liquid-expressing pressure in a selected manner to the meats whereby moisture is expressed therefrom. Thus, a liquid-expressing positive pressure is applied to the cured meats forcing the moisture present in fresh meats outwardly toward the surface. Preferably, the pressure is continuously applied so that the meat being treated is continuously being compacted and the various individual meat particles are continuously being urged toward one another mechanically forcing moisture from the individual particles. This may generally be done with a variety of devices certain embodiments of which will be explained in more detail hereinafter, and generally comprises placing the meat into an appropriate device which applies liquid-expressing pressure, such as to localized portions of the meats while leaving other portions thereof free from pressure so that moisture is forced outwardly from such meats.

Thereafter, the meat, while still under liquid-expressing pressure is subjected to a drying atmosphere having excessively low humidity and high temperature conditions for rapid removal of the surface moinsture from the pressurized meats. Conveniently, this type of drying atmosphere may be achieved in a conventional "smoke house" wherein heated air is forced through a relatively small confined space or chamber containing the meats. As will be appreciated, these type of drying chambers are referred to in the art as smoke houses even though no smoke per se is utilized in the process and only clean heated air is utilized. Such air is, of course, heated to increase its water carrying capacity in accordance with well understood principles. Thus, ambient air is heated to a higher temperature (i.e. at least about 100° F.) without the addition of any moisture thereby reducing the relative humidity of such air within the drying chamber to a very low percentage.

Generally, it is preferable that extremly low humidity conditions be utilized and generally the humidity of the drying atmosphere should be at least below about 20% (and down to about 10%) relative humidity; in other words, the relative humidity should be as low as possible consistent with economical considerations and available means of achieving such low humidity conditions. In conventional drying chambers or "smoke houses" referred to hereinabove a convenient means of determining the humidity of the atmosphere within the chamber is by a psychrometer, which is merely a conventional device for measuring relative humidity or the moisture content of air by two temperature measurements, a dry-bulb temperature and a wet-bulb temperature. The wet-bulb thermometer (which is a conventional thermometer having a fabric wick covering the bulb of such thermometer and in contact with distilled water) measures the temperature inside the drying chamber as cooled by the evaporation of the moisture surrounding its bulb and the dry-bulb thermometer (which is merely a conventional thermometer) measures the actual temperature within the chamber. The difference between the two bulb readings is generally referred to as a wet-bulb depression, which may be converted by a standard psychrometric chart or a relative humidity table into a percent saturation figure. Of course, such figures allow one to readily determine the relative humidity of the atmosphere or the amount of moisture such an atmosphere can support. Such measurements of humidity conditions are well understood in the art and it is not believed that further explanations thereof are necessary. In the instant process it has been discovered that wet-bulb depressions of at least 30° F. below the dry-bulb temperatures must be achieved to yield the rapid drying desired and bulb depressions of below about 60° F. have been utilized successfully. These drastic wet bulb depressions are achieved by heating ambient air to an elevated temperature as high as possible but somewhat below the cooking and/or melting point of any meltable constituents in the meats since temperatures above this area would decharacterize the meats. Of course, in order to maintain the humidity conditions within the drying atmosphere it is necessary to remove or otherwise re-dry the air after it has contacted the meat. A convenient means of increasing the rate of evaporation from the surface of the meat is to rapidly move the drying atmosphere past the meats being dried.

The pressurized meat (i.e. continuously subjected to liquid-expressing pressure) is maintained under the drying atmospheric conditions for a period of time sufficient to remove an amount of moisture from the meat thereby imparting shelf stability to the dried meats under normal, non-refrigerated conditions. Generally the time period is dependent upon the actual surface area of the individual meat product pieces being dried. For example, a three-inch diameter sausage product is dried in about 18 hours per pound of product in accordance with the principles of the invention, whereas in accordance with traditional methods the drying rate for a three-inch diameter sausage is about 100 hours per pound of product. Of course the drying rate is different for different sized products so that no generalized rate can be set without reference to the surface area, diameter, etc. of the meat product being treated. However, generally the drying process must be so regulated to remove about 50% of the moisture by total weight of cured meat. In other words, the moisture remaining in a finished product must not be more than about 50% of the total weight of solids and moisture in such finished product. This may be established in a number of ways and is conveniently established by determining the weight of the dried means in comparison to the fresh meats and calculating the percentage yield of finished product. On the average, it has been noted that a yield of not more than 70% must be achieved to obtain a product that has shelf stability for elongated periods of time in a non-refrigerated environment. After a sufficient dryness in the meat product has been achieved, the meats are removed from the drying atmosphere and packaged as desired.

FIG. 2 illustrates an embodiment of a mechanical means, such as an open mold device 20 utilized to apply selective liquid-expressing pressure to meats according to the principles of the invention. A pair of essentially rectangular frames 21 and 21a are fashioned from a suitably rigid material, such as metal in the form of a rod having its ends interconnected with a plurality of transverse cross members 22 and longitudinal cross members 23 rigidly attached, as by welding, to the frames 21 and 21a. The upper and lower frame members 21 and 21a are essentially of identical construction except that the lower frame 21a may be provided with an enlarged center rod member 24 rigidly attached between a pair of longitudinally extending cross members 23. Rod member 24 conveniently provides a means of impressing a desired shape into the meats being cured. The plurality of suitable spring means 28 (i.e., 3 inch stainless steel springs) are uniformly distributed about the outer periphery of the open mold device 20 for interconnecting the upper and lower frames 21 and 21a respectively and applying mechanical pressure to meats between the frames. These springs must be of sufficient strength and size to exert continual positive liquid-expressing pressure on the meats without causing physical damage, as by shearing, to such means. The ground or comminuted meat product is cured, seasoned and then stuffed into commercial casings composed of a moisture-porous material to permit transfer of moisture from the meat product to the surface of the casings. A suitable piece of prepared and cured meat 27 is placed (although a plurality of such pieces could also be used) on the lower frame member 21a and covered with the upper frame member 21 and the plurality (generally between four to ten) of spring members 28 are interconnected therebetween so as to continuously apply a positive liquid-expressing pressure on selected areas of the meat forcing moisture outwardly therefrom. The mold device 20, containing meat under a liquid-expressing pressure is then placed in the drying atmosphere described hereinbefore for rapid removal of moisture from the surfaces of the meat.

FIG. 3 illustrates a finished meat product 27b having an essentially B-shaped cross section 27a impressed thereon by the rod member 24 of lower frame 21a in FIG. 2 and has a surface grid pattern corresponding to the pattern of cross sectioned members 22 and 23. This B-shaped cross section 27a of the finished meat product 27b yields an aesthetic effect when such meat product is sliced (and it will be appreciated that the casing may be removed before slicing) into relatively thin slices for serving and/or packaging as desired. As will be appreciated, the finished meat product 27b may be a comminuted meat product or a solid piece of muscle meat of any type such as beef, pork, poultry, mutton, etc.

FIG. 4 illustrates another open mold device 30 utilized in the practice of the instant invention to apply a positive-liquid-expressing pressure to selected areas of the meat product. Rigid rectilinear frame members 31 and 31a are provided of a suitable size (i.e., 12" x 48") having a plurality of longitudinally extending cross members 33 and a plurality of horizontally extending cross members 32 intersecting one another and being suitably attached to the frames 31 and 31a in a rigid manner, as by welding. Upper frame member 31 is provided with a pair of spaced rod members 35 which impress a desired shape on the meat product. Lower frame member 31a is provided with a single rod member 34 for the same purpose. The rod members 34 and 35 are suitably attached to the frame members as by welding or other means as desired. As will be appreciated, the mold devices may be constructed to impress any desired shape to the finished meat products. The cured and cased meat product 37 is placed between the frame members and a plurality of springs 38 are attached to the frames continuously urging the frames toward one another and thereby causing the cross members 32 and 33 and rod members 34 and 35 to apply liquid-expressing pressure to selected areas of the meat product 37 and express moisture therefrom while impressing the desired shape into the meat product 37. After the meat has been suitably positioned within the device 30, it is positioned in the drying atmosphere as described hereinbefore and the finished meat product 37b then irreversibly assumes the impressed shape, such as shown in FIG. 5. The finished product 37b has a cross-sectional shape 37a which is non-regular and generally conforms to the impression left therein by the device 30. As will be appreciated, any variety of shapes may be irreversibly impressed on the meat as desired, including square shapes, cylindrical shapes and/or the irregular shapes illustrated in FIGS. 3 and 5.

Referring momentarily back to the drying atmosphere utilized to rapidly dry the meat products of the instant invention, it must be pointed out that the temperatures utilized within the drying chamber are relativaly high temperatures, which are as high as possible and just below the melting point of any meltable meat constituents in the meat product, i.e., the particular fats therein. Thus, for example, beef fat generally melts at temperatures of about 118° F.; while pork fat melts at about 115° F. Thus, in accordance with the process of the instant invention, it is desirable to utilize as high a temperature as possible without "decharacterizing" the product under treatment, i.e., causing an undesirable flavor change as by cooking or the like. Generally, drying temperatures range from about 100° F. to about 180° F. and are preferably in the range of 120° F. to 160° F.

In order to more fully illustrate the principles of the invention, a number of examples will be set forth, however, it should be understood that these are merely by way of illustration and are not to be construed as limiting the invention.

EXAMPLE 1

Comminuted beef product 100 pounds of lean beef meat was trimmed of sinew and connecting tissue. The trimmings were set aside for later use and the trimmed meat was ground through a ⅜ inch plate in a single pass in a conventional grinding machine. A portion of the trimmings, i.e., about 15% by weight of the trimmed meat, was then passed four times through a ¼ inch plate in a conventional meat grinding machine and the ground lean meat and the trimmings were intermixed mechanically. A dry cure mixture composed of about 6 pounds of salt, 2¼ ounces of a mixture of sodium nitrate and sodium nitrate and about ¾ ounce sodium ascorbate was prepared and intermixed with the meat mixture. The prepared meat was then placed in a container and dry cured for a period of time of about 12 hours at 35° F. Thereafter, the pre-cured meat product was reworked in a mechanical mixer and mechanically stuffed into a plurality of commercial casings composed of a moisture-porous material. The size of each casing was approximately 5 inches in diameter and 24 inches in length. The stuffed casings were then placed in mold devices somewhat similar to that illustrated at FIG. 2 so that positive pressure liquid-expressing was applied to select areas of the casings. The combined mold and meat product was then placed in a pre-heated commercial "smoke house." The dry-bulb reading of the drying chamber or smoke house was 145° F. while the wet-bulb reading was 85° F. to 90° F. for a wet bulb depression of about 55° to 60° F. The heated dry air within the drying chamber was caused to move at a high velocity by an electrically driven fan. These drying conditions were maintained within the chamber for about 62 hours. A product yield of about 67% by weight was obtained, based on the weight of the cured meat. The product was then removed from the drying chamber and from the mold devices, and stored under non-refrigerated conditions. Good shelf stability was noted.

EXAMPLE 2

Comminuted chicken products 85 pounds of boneless chicken (both dark and white meats) was ground once through a ¾ inch standard plate in a conventional meat grinder and set aside. Then 15 pounds of chicken skin was passed twice through an ⅛ inch standard grinder plate in a conventional grinder and intermixed with the ground chicken meat. Then a cure mixture of about 2 pounds of salt, 3 pounds of corn syrup solids, 2¼ ounces of a mixture of sodium nitrate and sodium nitrite, 2 ounces of liquid smoke, 3 ounces of white pepper, and about ⅞ ounce of sodium ascorbate was prepared. The cure mixture was then mechanically intermixed with the ground meat product and mixed product stored at about 35° F. for a period of about 12 hours. Thereafter, the pre-cured product was stuffed into a plurality of commercial casings composed of a moisture-porous material, each having about a 3 inch diameter and an 18 inch length and placed in molds having a configuration somewhat similar to that illustrated at FIG. 4. The pressurized meat products were then placed in a pre-heated commercial drying chamber (i.e. smoke house) with the temperature of the dry-bulb thermometer maintained at about 154° F. and the wet-bulb thermometer at ambient temperature (i.e. about 95° F.). The air within the drying chamber was caused to move at a relatively high velocity by means of a motorized fan. These drying conditions were maintained in the drying chamber for a period of time of about 63 hours. A product yield of 69% by weight was achieved. The remaining moisture in the product was not more than 50% by total weight of solids and moisture in the dried product. After removal of the dried product from the drying chamber, it was sliced to yield aesthetically appearing convoluted cross-sections suitable for packaging and non-refrigerated storage.

EXAMPLE 3

Comminuted pork product 85 pounds of boneless ham was ground through a ¾ inch plate in a single pass and set aside. Then 15 pounds of lean ham trimmings were passed through an ⅛ inch plate four times and the ground trimmings and ground ham meats were then intermixed. A cure mixture was prepared comprising an intermixture of about 2 pounds of salt, 2 pounds of dried corn syrup solids, 2¼ ounces of a mixture of sodium nitrate and sodium nitrite, 4 ounces of liquid smoke, 3 ounces of white pepper, and about ⅞ ounce of sodium ascorbate. This cure mixture was intermixed with the ground ham and trimmings and stored for about 12 hours at 35° F. After the cure period, the meat mixture was again worked to remove the stiffness therefrom and then stuffed by a mechanical stuffer into a plurality of commercial casings composed of a moisture-porous material and placed in molds somewhat similar to that illustrated in FIG. 2. The combined mold and pack product assembly was then placed in the drying chamber which had a dry-bulb temperature of 155° F. and a wet-bulb temperature of about 85° F. for a wet-bulb depression of 70° F. The heated air within the drying chamber was rapidly moved past the pressurized meat for a period of approximately 46 hours, at which time the drying chamber was turned off and the meat product removed. The dried meat product represented a 69% yield and was suitable for non-refrigerated shelf storage and/or packaging. A careful examination of the product did not show any case hardening or hollow core characteristics. The surface thereof was only slightly wrinkled and contained the impressions of the mold utilized to apply the positive pressure.

EXAMPLE 4

Solid beef products

An inside round of beef weighing about 8 pounds and 5 ounces was rubbed with a cure mixture consisting of about 10 ounces of salt, 5 grams of a mixture of sodium nitrate and sodium nitrite and 2 grams of sodium ascorbate. The rubbed meat was then stored for 36 days at 35° F. to effect the cure. The cured meat was then placed in a mold somewhat similar to that illustrated at FIG. 2 and then placed in a pre-heated drying chamber. The dry-bulb thermometer in the drying chamber registered 136° F. and the wet-bulb registered about 80° F. for a wet-bulb depression of about 56° F. The air within the drying chamber was circulated at a high velocity during the drying period. The temperature and humidity conditions were maintained for 56 hours and the yield was 67.7% by weight of the cured meat. The product had excellent physical and taste characteristics and exhibited long shelf life under non-refrigerated conditions.

As will be appreciated, other meat products may be dried in accordance with the process of the invention. By having the desired meat product under continued liquid-expressing pressure, one is able to place such product in an environment which has a maximum capacity for absorbing the moisture from the surface of the meat products without causing any detrimental effects. The drying atmosphere is heated to the highest point possible which will maintain the desired characteristics of the product without decharacterizing the same. Thus, in case of certain muscle meat, a dry-bulb temperature of 150° F. and a wet-bulb temperature of 80° F. are utilizable to rapidly obtain a dried product. This type of drying atmosphere is in contrast to the heretofore traditional or known methods of drying meats and meat products. Rapid drying, by the utilization of maximum bulb depression, is only possible with the application of pressure to the meat and is not possible in drying methods wherein no pressure is applied to the meat product since various drawbacks (enumerated hereinbefore) are encountered.

The method of the instant invention is extremely efficient and produces meat products much faster than is possible by conventional methods. In order to further illustrate this, reference is had to the following table.

TABLE I

| Product | Preparation time by— | |
|---|---|---|
| | Traditional process | New process |
| Dried salami, 1″ diameter | 30 days | 3 days. |
| Dried salami, 2″ diameter | 60 days | 5 days. |
| Dried sausage, 3″ diameter | 90 days | 7 days. |
| Tasajo | 5 days | 1 day. |
| Dried beef | 5-7 days | 1-2 days. |

The above products were essentially of the same size and were prepared in essentially a similar manner. The traditional process (of drying) consisted of merely placing the particular product in an atmosphere having temperatures of approximately 60° F. to 65° F. and a slightly drier atmosphere than the relative humidity of the products to be dried. The new process (of drying) was substantially the same as set forth hereinabove in Examples 1 through 4. It will be noted that the new process was tremendously more efficient than the traditional method. Thus, in accordance with the instant process, small facilities may be utilized to produce large volumes of product and inventories can be maintained at lower levels than with traditional methods, since replacements in inventories can be almost immediately produced, as desired. Further, in accordance with the instant process, the meat products may be shaped into any desired form by the utilization of appropriate molds and the shape will remain irreversibly in the product after drying and impart further aesthetic characteristics to the finished product.

In summation, it will be seen that the invention provides a process of preserving moisture-containing meats which generally comprises intermixing various meat condiments into fresh, raw meats, continously applying positive liquid-expressing pressure to selected areas of the meats forcing moisture therefrom and subjecting the meat still under such liquid-expressing pressure to humidity-temperature conditions for a period of time sufficient to remove at least 50% of the moisture by total weight of product from the meats to impart ambient shelf stability to the meats. The temperature of the drying atmosphere is substantially above ambient and is just below the melting point of any meltable meat constituent in the meats, while the humidity conditions are extremely dry and are conveniently defined by a web-bulb depression in the range of about 30° F. to about 60° F. or more below the dry-bulb temperature. The drying process is extremely rapid as compared with traditional methods of the art and produces extremely desired products without imparting adverse effects on such products. Further, any type of meat or meat product can be preserved by the instant method at low costs in a high efficient manner.

I claim as my invention:

1. A process for preserving moisture-containing meats by curing and drying comprising: introducing meat curing and flavoring agents into fresh raw meats; continually applying positive liquid-expressing pressure to said meats so as to force moisture therefrom; and subjecting said meats, while under said liquid-expressing pressure to a drying atmosphere including temperatures in the range of about 120° to 180° F. and relative humidity conditions in the range of about 20% to about 10% for a period of time sufficient to remove at least 50% of the moisture, by total weight of the cured product.

References Cited

UNITED STATES PATENTS

| 2,227,738 | 1/1941 | Oswald et al. | 99—208 |
| 2,346,232 | 4/1944 | Pirest et al. | 99—208 |
| 3,385,715 | 5/1968 | Ishler et al. | 99—199 X |

HYMAN LORD, Primary Examiner

U.S. Cl. X.R.

99—159, 208